(12) United States Patent
Bathiche et al.

(10) Patent No.: US 8,022,942 B2
(45) Date of Patent: Sep. 20, 2011

(54) DYNAMIC PROJECTED USER INTERFACE

(75) Inventors: Steven N. Bathiche, Kirkland, WA (US);
Andrew D. Wilson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1062 days.

(21) Appl. No.: 11/658,000

(22) Filed: Jan. 25, 2007

(65) Prior Publication Data
US 2008/0180654 A1    Jul. 31, 2008

(51) Int. Cl.
*G06F 3/042*    (2006.01)
(52) U.S. Cl. .................. 345/176; 345/173; 345/175
(58) Field of Classification Search ........... 345/156, 345/173, 175, 176; 715/773; 700/84; 341/22
See application file for complete search history.

(56) References Cited

U.S. PATENT DOCUMENTS

| | | | |
|---|---|---|---|
| 4,107,784 A | 8/1978 | Van Bemmelen | 364/900 |
| 4,527,250 A | 7/1985 | Galdun et al. | 364/900 |
| 4,823,311 A | 4/1989 | Hunter et al. | 364/900 |
| 4,853,888 A | 8/1989 | Lata et al. | 364/900 |
| 5,181,029 A | 1/1993 | Kim | 241/20 |
| 5,305,449 A | 4/1994 | Ulenas | 395/500 |
| 5,748,177 A * | 5/1998 | Baker et al. | 345/172 |
| 5,818,361 A | 10/1998 | Acevedo | 341/23 |
| 5,909,211 A * | 6/1999 | Combs et al. | 345/172 |
| 6,121,960 A * | 9/2000 | Carroll et al. | 345/173 |
| 6,175,679 B1 * | 1/2001 | Veligdan et al. | 385/120 |
| 6,453,027 B1 | 9/2002 | Kang et al. | 379/110.01 |
| 6,758,615 B2 | 7/2004 | Monney et al. | 400/479 |
| 7,084,859 B1 * | 8/2006 | Pryor | 345/173 |
| RE40,368 E * | 6/2008 | Arnon | 345/156 |
| 7,733,310 B2 * | 6/2010 | Hajjar et al. | 345/84 |
| 2002/0054030 A1 * | 5/2002 | Murphy | 345/173 |
| 2002/0149563 A1 | 10/2002 | Swofford | 345/161 |
| 2003/0165048 A1 * | 9/2003 | Bamji et al. | 361/681 |
| 2004/0057769 A1 * | 3/2004 | Ward et al. | 400/481 |
| 2004/0066374 A1 * | 4/2004 | Holloway et al. | 345/168 |
| 2004/0207605 A1 * | 10/2004 | Mackey et al. | 345/173 |
| 2004/0259599 A1 * | 12/2004 | Okawa | 455/567 |
| 2005/0099403 A1 * | 5/2005 | Kraus et al. | 345/173 |
| 2005/0129199 A1 * | 6/2005 | Abe | 379/90.01 |

(Continued)

FOREIGN PATENT DOCUMENTS

WO    WO 2005/057320 A2    6/2005

OTHER PUBLICATIONS

Lancor Konyin Multilingual Keyboard, Lagos Analysis Corporation, 1994-2006.

(Continued)

*Primary Examiner* — Amare Mengistu
*Assistant Examiner* — Koosha Sharifi-Tafreshi
(74) *Attorney, Agent, or Firm* — Westman, Champlin & Kelly, P.A.

(57) ABSTRACT

A dynamic projected user interface device is disclosed, that includes a projector, a projection controller, and an imaging sensor. The projection controller is configured to receive instructions from a computing device, and to provide display images via the projector onto display surfaces. The display images are indicative of a first set of input controls when the computing device is in a first operating context, and a second set of input controls when the computing device is in a second operating context. The imaging sensor is configured to optically detect physical contacts with the one or more display surfaces.

16 Claims, 9 Drawing Sheets

U.S. PATENT DOCUMENTS

| | | | | |
|---|---|---|---|---|
| 2005/0164148 | A1* | 7/2005 | Sinclair | 434/112 |
| 2006/0061542 | A1* | 3/2006 | Stokic | 345/156 |
| 2006/0227120 | A1* | 10/2006 | Eikman | 345/175 |
| 2007/0279391 | A1* | 12/2007 | Marttila et al. | 345/169 |

OTHER PUBLICATIONS

M. C. Ramsey, T. -H. Ong, H. Chen, "Multilingual Input System for the Web-An Open Multimedia Approach of Keyboard and Handwriting Recognition for Chinese and Japanese," adl, p. 188, Fifth International Forum on Research and Technology Advances in Digital Libraries (ADL '98), 1998.

"Iterm-Multilingual X-Windows Indian Script Terminal" by Jyotirmoy Saikia to the Department of Computer Science & Engineering, Indian Institute of Technology, Kanpur, May 2002.

"Towards an Intelligent Multilingual Keyboard Ssytem" by Tanapong Potipiti et al., Human Language Technology Conference, San Diego, p. 1-4, 2001.

* cited by examiner

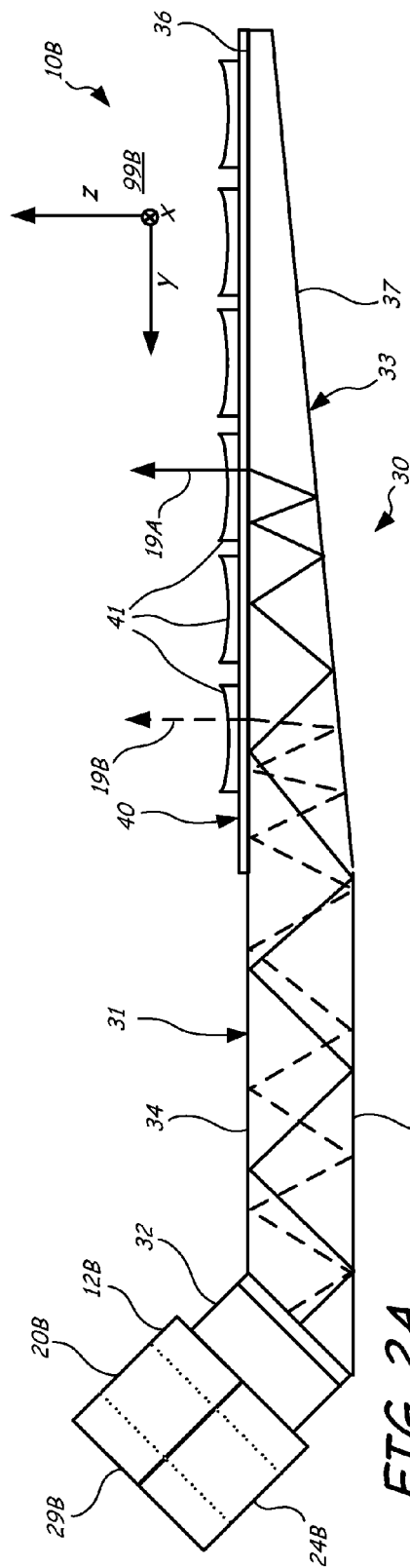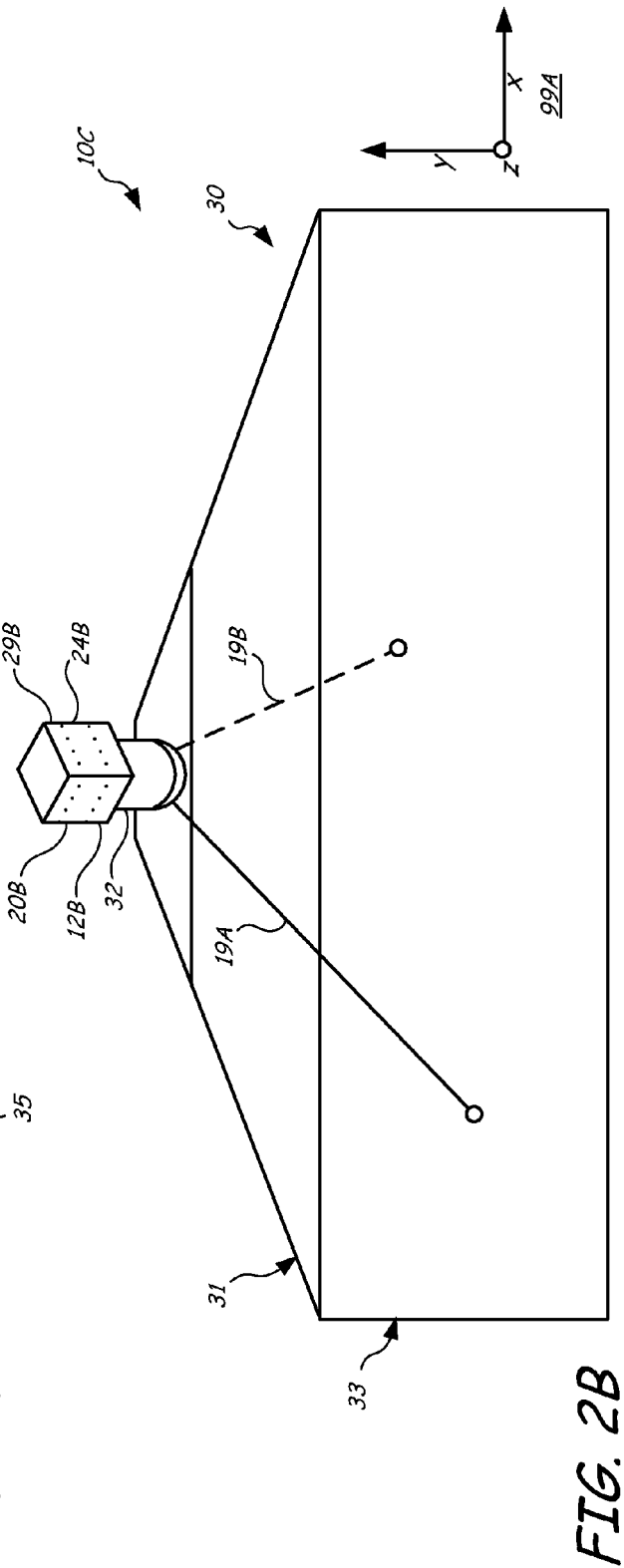

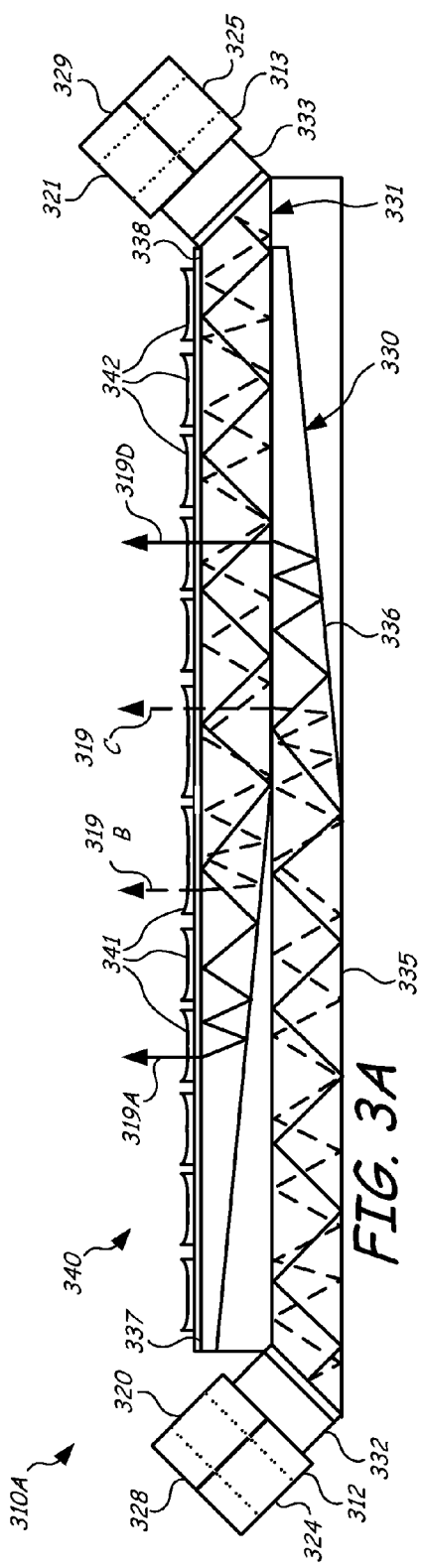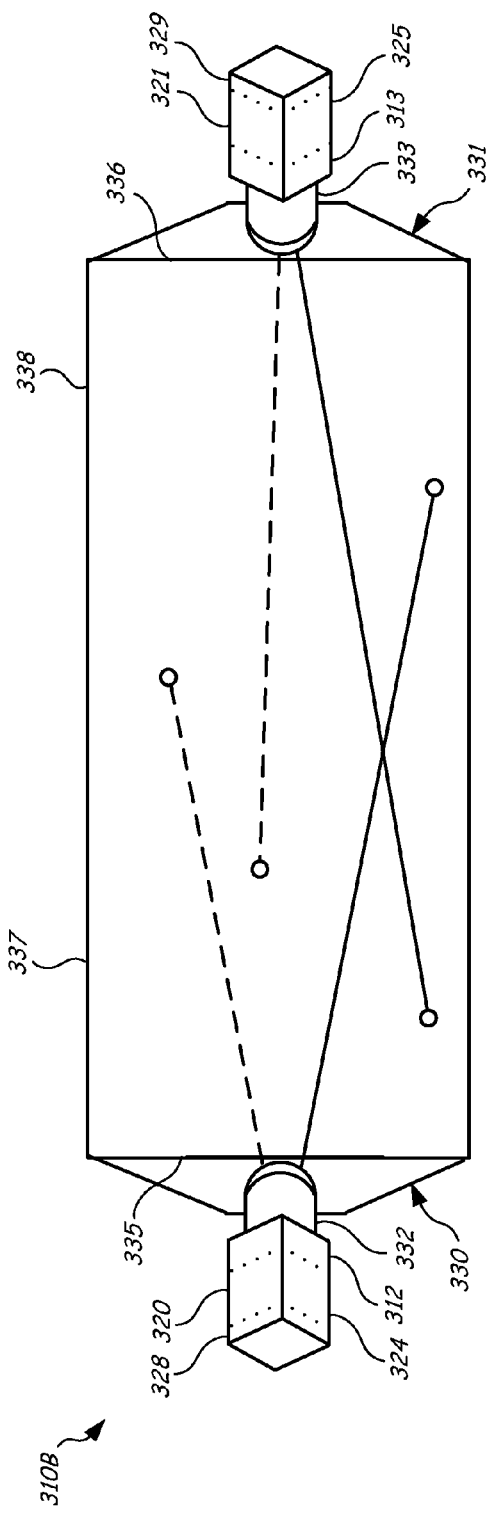

DYNAMIC PROJECTED USER INTERFACE

BACKGROUND

The functional usefulness of a computing system is determined in large part by the modes in which the computing system outputs information to a user and enables the user to make inputs to the computing system. A user interface generally becomes more useful and more powerful when it is specially tailored for a particular task, application, program, or other context of the operating system. Perhaps the most widely spread computing system input device is the keyboard, which provides alphabetic, numeric, and other orthographic keys, along with a set of function keys, that are generally of broad utility among a variety of computing system contexts. However, the functions assigned to the function keys are typically dependent on the computing context and are assigned often very different functions by different contexts. Additionally, the orthographic keys are often assigned non-orthographic functions, or need to be used to make orthographic inputs that do not necessarily correspond with the particular orthographic characters that are represented on any keys of a standard keyboard, often only by simultaneously pressing combinations of keys, such as by holding down either or any combination of a control key, an "alt" key, a shift key, and so forth. Factors such as these limit the functionality and usefulness of a keyboard as a user input device for a computing system.

Some keyboards have been introduced to address these issues by putting small liquid crystal display (LCD) screens on the tops of the individual keys. However, this presents many new problems of its own. It typically involves providing each of the keys with its own Single Twisted Neumatic (STN) LCD screen, LCD driver, LCD controller, and electronics board to integrate these three components. One of these electronics boards must be placed at the top of each of the mechanically actuated keys and connect to a system data bus via a flexible cable to accommodate the electrical connection during key travel. All the keys must be individually addressed by a master processor/controller, which must provide the electrical signals controlling the LCD images for each of the keys to the tops of the keys, where the image is formed. Such an arrangement tends to be very complicated, fragile, and expensive. It places each of many LCD screens where they must be repeatedly struck by the user's fingers, posing the likelihood of being cracked. The LCD screens are flat, thereby preventing the design of concave or otherwise shaped keypads to help a user's sense of tactile feedback. And the flexible data cable attached to each of the keypads is subject to mechanical wear-and-tear with each keystroke.

The discussion above is merely provided for general background information and is not intended to be used as an aid in determining the scope of the claimed subject matter.

SUMMARY

A dynamic projected user interface is hereby disclosed, in a variety of different embodiments. According to one illustrative embodiment, a dynamic projected user interface device includes a projector, a projection controller, and an imaging sensor. The projection controller is configured to receive instructions from a computing device, and to provide display images via the projector onto display surfaces. The display images are indicative of a first set of input controls when the computing device is in a first operating context, and a second set of input controls when the computing device is in a second operating context. The imaging sensor is configured to optically detect physical contacts with the one or more display surfaces.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 2A illustrates a dynamic projected user interface device, according to another illustrative embodiment.

FIG. 2B illustrates a dynamic projected user interface device, according to another illustrative embodiment.

FIG. 3A illustrates a dynamic projected user interface device, according to another illustrative embodiment.

FIG. 3B illustrates a dynamic projected user interface device, according to another illustrative embodiment.

DETAILED DESCRIPTION

Figure 1:
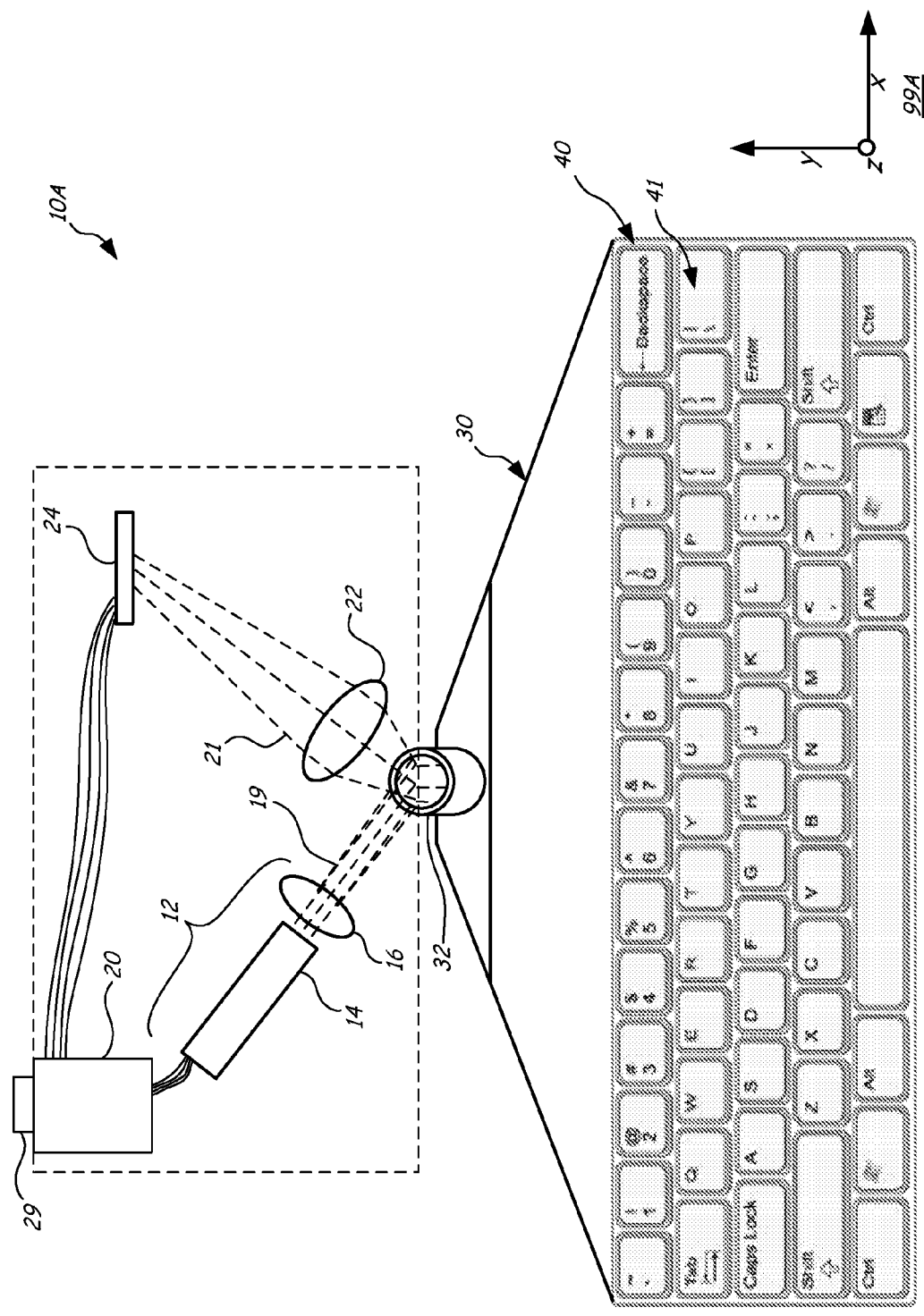
FIG. 1 illustrates a dynamic projected user interface device, according to an illustrative embodiment.

FIG. 1 depicts a dynamic projected user interface device 10A, according to an illustrative embodiment. Dynamic projected user interface 10 may be illustrative of embodiments that include devices, computing systems, computing environments, and contexts that enable associated method embodiments and associated executable instructions configured to be executable by computing systems, for example. The following discussion provides further details of an illustrative sampling of various embodiments. The particular illustrative embodiments discussed below are intended as illustrative and indicative of the variety and broader meaning associated with the disclosure and the claims defined below.

As depicted in FIG. 1, dynamic projected user interface device 10A is depicted in a simplified block diagram that includes projector 12, projection controller 20, and imaging sensor 24. Projector 12 illustratively includes a laser source 14 in this embodiment. Projector 12 also includes collimator 16 in the beam path of laser emitter 14, so that a laser 19 emitted from laser emitter 14 passes through and is collimated by collimator 16, in this illustrative embodiment. (FIG. 1 is not meant to represent the actual optics of dynamic projected user interface device 10A or the actual path of laser 19, which are readily within design choices that may be made within the understanding of those skilled in the art. Rather, FIG. 1 demonstrates a simplified block diagram to make clear the concepts involved.) Projector 12 may also emit any other kind of electromagnetic radiation, such as from a laser, an LED array, a cathode ray, or other type of source, and in any frequency range, including but not limited to visible light, ultraviolet rays, infrared rays, other frequencies, or a combination of any of these.

Laser 19 subsequently follows a beam path into waveguide nexus 32 of waveguide 30, which directs it to the surfaces of the keys 41 of keyboard 40, such that the surfaces of the keys constitute display surfaces for display images provided via projector 12. Coordinate set 99A is depicted in the corner, for purposes of correlating the depiction of dynamic projected user interface device 10A in FIG. 1 with additional depictions in later figures. Coordinate set 99A shows an X direction going from left to right of the keyboard 40, a Y direction going from bottom to top of keyboard 40, and a Z direction going from down to up, "out of the page" and perpendicular to the plane of keyboard 40. In this embodiment, keyboard 40 does not have any static characters or symbols pre-printed onto any of the surfaces of the keys 41; rather, the surfaces of the keys 41 are configured to be semi-transparent and to serve as the display surfaces for images that are uniquely provided to each of the keys 41 via projector 12, images that may also be changed at will according to the current operating context of an associated computing system.

Lens 22 is disposed adjacent to imaging sensor 24, and is configured to receive optical signals returned from the surfaces of the keys 41 and to focus them onto imaging sensor 24. Imaging sensor 24 may illustratively be composed mainly of a complementary metal-oxide-semiconductor (CMOS) array, for example. It may also be a different type of imager such as a charge-coupled device (CCD), a single pixel photodetector with a scanned beam system, or any other type of imaging sensor.

Projection controller 20 is configured to receive and operate according to instructions from a computing device (not depicted in FIG. 1; see below). Projection controller 20 communicates with an associated computing device through communication interface 29, which may include a wired interface such as according to one of the Universal Serial Bus (USB) protocols, for example, or may take the form of any of a number of wireless protocols. Projection controller 20 is also configured to return inputs detected through imaging sensor 24 to the associated computing system. The associated computing system may be running any of a variety of different applications or other operating contexts, which may determine the output and input modes in effect at a particular time for dynamic projected user interface device 10A.

Projection controller 20 is configured to provide one or more display images via projector 12 onto surfaces of the keys 41. The display images that are projected are indicative of a first set of input controls when the computing device is in a first operating context, and a second set of input controls when the computing device is in a second operating context. That is, one set of input controls may include a typical layout of keys for orthographic characters such as letters of the alphabet, additional punctuation marks, and numbers, along with basic function keys such as "return", "backspace", and "delete", along with a suite of function keys along the top row of the keyboard 40.

While function keys are typically labeled simply "F1", "F2", "F3", etc., the projector provides images onto the corresponding keys that explicitly label their function at any given time as dictated by the current operating context of the associated computing system. For example, the top row of function keys that are normally labeled "F1", "F2", "F3", etc., may instead, according to the dictates of one application currently running on an associated computing system, be labeled "Help", "Save", "Copy", "Cut", "Paste", "Undo", "Redo", "Find and Replace", "Spelling and Grammar Check", "Full Screen View", "Save As", "Close", etc. Instead of a user having to refer to an external reference, or have to remember the assigned functions for each of the function keys as assigned by a particular application, the actual words indicating the particular functions appear on the keys themselves for the application or other operating context that currently applies.

Imaging sensor 24 is configured, such as by being disposed in connection with the waveguide 30, to receive optical signals coming in the reverse direction in which the display images are being provided by projector 12, from the surfaces of the keys 41. Imaging sensor 24 may therefore optically detect when one of the keys 41 is pressed. For example, imaging sensor 24 may be enabled to detect when the edges of one of keys 41 approaches or contacts the surface of waveguide 30, in one illustrative embodiment. Because the surfaces of the keys 41 are semi-transparent, in this embodiment, imaging sensor 24 may also be enabled to optically detect physical contacts with the surfaces of the keys 41, by imaging the physical contacts through the waveguide 30, in another detection mode. Even before a user touches a particular key, the imaging sensor 24 may already detect and provide tracking for the user's finger. Imaging sensor 24 may therefore optically detect when the user's finger touches the surface of one of the keys 41. This may provide the capability to treat a particular key as being pressed as soon as the user touches it. Different detection modes and different embodiments may therefore provide any combination of a variety of detection modes that configure imaging sensor 24 to optically detect physical contacts with the one or more display surfaces.

Imaging sensor 24 may further be configured to distinguish a variety of different modes of physical contact with the display surfaces. For example, imaging sensor may be configured to distinguish between the physical contact of a user's finger with a particular key and the key being pressed. It may also include, for example, distinguishing if the user's finger makes sliding motions in one direction or another across the surface of one of the keys, or distinguishing how slowly or how forcefully one of the keys is pressed. Dynamic projected user interface device 10A may therefore be enabled to read a variety of different inputs for a single one of the keys 41, as a function of the characteristics of the physical contact with that display surface. These different input modes per a particular key may be used in different ways by different applications running on an associated computing system.

For example, a game application may be running on the associated computing system, a particular key on the keyboard may control a particular kind of motion of a player-controlled element in the game, and the speed with which the user runs her finger over that particular key may be used to determine the speed with which that particular kind of motion is engaged in the game. As another illustrative example, a music performance application may be running, with different keys on keyboard 40 (or on a different keyboard with a piano-style musical keyboard layout, for example) corresponding to particular notes or other controls for performing music, and the slowness or forcefulness with which the user strikes one of the keys may be detected and translated into that particular note sounding softly or loudly, for example. Many other possible usages are possible, and may be freely used by developers of applications making use of the different input modes enabled by dynamic projected user interface device 10A.

In another illustrative embodiment, the imaging sensor 24 may be less sensitive to the imaging details of each of the particular keys 41, or the keys 41 may be insufficiently transparent to detect details of physical contact by the user, or plural input modes per key may simply not be a priority, and the imaging sensor 24 may be configured merely to optically detect physical displacement of the keys 41. This in itself provides the considerable advantage of implementing an optical switching mode for the keys 41, so that keyboard 40 requires no internal mechanical or electrical switching elements, and requires no moving parts other than the keys themselves. In this and a variety of other embodiments, the keys may include a typical concave form, in addition to enabling typical up-and-down motion and other tactile cues that users typically rely on in using a keyboard rapidly and efficiently. This provides advantages over virtual keys projected onto a flat surface, and to keys in which the top surface is occupied by an LCD screen, which thereby is flat rather than having a concave form, and thereby may provide less of the tactile cues that efficient typers rely on in using a keyboard. Since the up-and-down motion of the keys is detected optically, and has no electrical switch for each key as in a typical keyboard or electronics package devoted to each key as in some newer keyboards, the keys 41 of keyboard 40 may remain mechanically durable long after mechanical wear-and-tear would degrade or disable the electrical switches or electronic components of other keyboards.

In yet another embodiment, the keys 41 may be mechanically static and integral with keyboard 40, and the imaging sensor 24 may be configured to optically detect a user striking or pressing the keys 41, so that keyboard 40 becomes fully functional with no moving parts at all, while the user still has the advantage of the tactile feel of the familiar keys of a keyboard.

A wide variety of kinds of keypads may be used in place of keyboard 40 as depicted in FIG. 1, together with components such as projector 12, projection controller 20, imaging sensor 24, and waveguide 30. For example, other kinds of keypads that may be used with a device otherwise similar to dynamic projected user interface device 10A of FIG. 1 include a larger keyboard with additional devoted sections of function keys and numeric keys; an ergonomic keyboard divided into right and left hand sections angled to each other for natural wrist alignment; a devoted numeric keypad; a devoted game controller; a musical keyboard, that is, with a piano-style layout of 88 keys, or an abbreviated version thereof; and so forth.

Dynamic projected user interface device 10A thereby takes a different tack from the effort to provide images to key surfaces by means of a local LCD screen or other electronically controlled screen on every key, each key with the associated electronics. Rather than sending electrical signals from a central source to an electronics and screen package at each of the keys, photons are generated from a central source and optically guided to the surfaces of the keys, in this illustrative embodiment. This may use light waveguide technology that can convey photons from entrance to exit via one or more waveguides, which may be implemented as simply as a shaped clear plastic part, as an illustrative example. This provides advantages such as greater mechanical durability, water resistance, and lower cost, among others.

FIGS. 2A and 2B depict the same dynamic projected user interface device 10A as in FIG. 1, but in different views, here labeled as 10B and 10C, according to one illustrative embodiment. FIG. 2A includes coordinate set 99B, while FIG. 2B includes coordinate set 99A as it appears in FIG. 1, to indicate that dynamic projected user interface device 10A is depicted in the same orientation as in FIG. 1, although in a cutaway (and further simplified) version in FIG. 2B to showcase the operation of waveguide 30. FIG. 2A is also intended to demonstrate further the operation of waveguide 30, from a side view. As indicated by coordinate set 99B, the view of FIG. 2A corresponds to the X direction, from left to right side of keyboard 40, going "into the page", perpendicular to the view of this figure; the Y direction, indicating bottom to top of keyboard 40, is here going from right to left; and the Z direction, indicating the direction perpendicular to the plane of keyboard 40, is here going from down to up. Analogously to the depiction of FIG. 1, dynamic projected user interface device 10B, 10C includes a projector 12B, a projection controller 20B, an imaging sensor 24B, a waveguide nexus 32, and a communication interface 29B, in an analogous functional arrangement as described above with reference to FIG. 1.

Waveguide 30 includes an expansion portion 31 and an image portion 33. Expansion portion 31 has horizontal boundaries 38 and 39 (shown in FIG. 2B) that diverge along a projection path away from the projector, and vertical boundaries 34 and 35 that are substantially parallel. Image portion 33 has vertical boundaries 36 and 37 that are angled relative to each other. Projector 12B is positioned in interface with the first waveguide section 31, by means of waveguide nexus 32. Waveguide nexus 32 is a part of waveguide 30 that magnifies the images from projector 12B and reflects them onto their paths into expansion portion 31, as particularly seen in FIG. 2B. The image portion 33 is positioned in interface with the display surface of the keyboard 40, such that rays emitted by the projector 12B are internally reflected throughout the expansion portion 31 to propagate to image portion 33, and are transmitted from the image portion 33 to the keys 41, as further elaborated below.

As FIG. 2B demonstrates, waveguide 30 is substantially flat, and tapered along its image portion 33. Waveguide 30 is disposed between the keypad 40 at one end, and the projector 32 and imaging sensor 24B at the other end. Waveguide 30 and its boundaries 34, 35, 36, 37 are configured to convey rays of light or another electromagnetic signal, such as representative projection ray paths 19A and 19B, with total internal reflection through expansion portion 31, and to convey the images by total internal reflection through a portion of image portion 33 as needed before directing each ray in an image at upper boundary 36 at an angle past the critical angle, and which may be orthogonal or relatively close to orthogonal to the surfaces of keys 41, to cause the rays to transmit through upper boundary 36 to render visible images. The critical angle for distinguishing between internal reflection and transmission is determined by the index of refraction of both the substance of waveguide 30 and that of its boundaries 34, 35, 36, 37. Waveguide 30 may be composed of acrylic, polycarbonate, glass, or other appropriate materials for transmitting optical rays, for example. The boundaries 34, 35, 36 and 37 may be composed of any appropriate optical cladding suited for reflection, while boundary 36 includes a number of discontinuities for inclusion of the keys 41 as display surfaces, which may be semi-transparent and diffuse, in this illustrative embodiment, so that they are well suited to forming display images that are easily visible from above due to optical projections from below, as well as being suited to admitting optical images of physical contacts with the keys 41, in this illustrative embodiment. The surfaces of keys 41 may also be coated with a turning film, which may ensure that the image projection rays emerge orthogonally to the key surfaces. The turning film may in turn be topped by a scattering screen on each of the key surfaces, to encourage visibility of the display images from a wide range of viewing angles. In another embodiment, optical fibers may be used to transmit optical signals along at least part of waveguide 30, for example.

As a further advantage of these embodiments, the entire keyboard 40 may be detached at waveguide nexus 32 and easily washed. Keyboards in generally notoriously tend to get dirty over time, but are inconvenient to wash, and in traditional keyboards, have electrical switches associated with each of the keys. This becomes more of an issue with efforts to make keyboards with a screen and associated electronics package associated with individual keys. On the contrary, keyboard 40 has no electrical components, and, once detached at waveguide nexus 32, can easily have cleaning solution applied to it or even be submerged in cleaning solution, without any electrical components to be concerned about. Keyboard 40 may thereby easily be washed, dried, and reattached at waveguide nexus 32, thereby enabling a user to conveniently keep a cleaner keyboard. Alternately, projector 12B, projection controller 20B, imaging sensor 24B, and communication interface 29B may all be enclosed within a watertight chamber. The lack of electrical components in the body of keyboard 40 also means that any accidental spill of a liquid onto keyboard 40 will not pose a threat to it, as it would to a traditional keyboard or a keyboard with a local screen and associated electronics at individual keys.

As another advantage, the keys 41 may be associated with a tray that may be removed from the top of keyboard 40, so that the surface of keyboard 40 may then become a single display. The entire single display may also track lateral stroke direction to enable multiple input modes depending on different directions or characteristics of the user's finger strokes.

Projector 12B may project a monochromatic laser, or may use a collection of different colored lasers in combination to create full-color display images on keys 41 or keyboard 40, in an illustrative embodiment. Full color may also be achieved by using a violet laser for projector 12B, and using photoluminescent materials to alternately scale down the energy of the violet laser to provide a full color spectrum in the images projected onto keys 41 or keyboard 40, in another illustrative embodiment.

Projector 12B may also include a position sensing emitter that emits parallel to the image projection emitter. The position sensing emitter may be a non-visible form of light such as an infrared laser, for example, and the imaging sensor may be configured to image reflections of the infrared light as they are visible through the surfaces of the keys 41. This provides another illustrative example of how a user's fingers may be imaged and tracked in interfacing with the keys 41, so that multiple input modes may be implemented for each of the keys 41, for example by tracking an optional lateral direction in which the surfaces of the keys are stroked in addition to the basic input of striking the keys vertically.

Because the boundaries 34, 35 of expansion portion 31 are parallel and the boundaries 36, 37 of second waveguide section are angled relative to each other at a small angle, waveguide 30 is able to propagate projections provided by projector 12B from a small source, through a substantially flat package, to form images on a broad array of imaging surfaces such as the keys 41 of keyboard 40, and to convey images from that broad array back to imaging sensor 24B. Waveguide 30 is therefore configured, according to this illustrative embodiment, to enable imaging sensor 24B to convey images provided by projector 12B onto the surfaces of keys 41 (only a sampling of which are explicitly indicated in FIG. 2A), as well as to detect physical displacement of the keys 41. The specific details of the embodiment of FIGS. 2A and 2B are exemplary and do not connote limitations. For example, a few other illustrative embodiments are provided in the subsequent figures.

FIG. 3A depicts another illustrative embodiment of a dynamic projected user interface device 310A, which is also depicted under the label 310B from a different view in FIG. 3B. Dynamic projected user interface device 310A/310B uses a pair of two waveguides 330, 331, with upper waveguide 331 stacked on top of lower waveguide 330, and each used to project images onto a separate half of keyboard 340. This provides a way to prevent the form factor of the keyboard 340 from having bulky portions outside the region of the keys 431, 342, by putting the expansion portions 335, 338 underneath the keyboard 340.

One projector 312, projection controller 320, imaging sensor 324, and communication interface 328 are operatively connected to waveguide nexus 332 and thereby to lower waveguide 330, while another projector 313, projection controller 321, imaging sensor 325, and communication interface 329 are operatively connected to waveguide nexus 333 and thereby to upper waveguide 331. Expansion portion 335 of lower waveguide 330 lies underneath image portion 337 of upper waveguide 331, while expansion portion 338 of upper waveguide 331 lies on top of image portion 336 of lower waveguide 330. Keyboard 340 is laid on top of upper waveguide 331. Keyboard 340 has keys 341 (a representative sample of which are indicated with reference number 341) on the left side thereof, and keys 342 on the right side thereof (again, a representative sample of which are indicated with reference number 342).

Upper waveguide 331 is thereby enabled to convey images projected by projector 313 through expansion portion 338 to image portion 337 and on to the surfaces of keys 341 on the left side of keyboard 340, illustratively indicated by the representative projection ray paths 319A and 319B. Lower waveguide 330 is similarly enabled to convey images projected by projector 312 through expansion portion 335 to image portion 336; as these images are projected out the top of image portion 336, they then pass entirely through expansion portion 339 of upper waveguide 331, and on to the surfaces of keys 342 on the right side of keyboard 340, illustratively indicated by the representative projection ray paths 319C and 319D. Although the horizontal boundaries of expansion portion 339 of upper waveguide 331 are strongly diverging, the vertical boundaries thereof are planar and parallel, and the projection ray paths of the images projected through lower waveguide 330 may be directed substantially orthogonally to the lower vertical boundary of expansion portion 339 of upper waveguide 331 or otherwise configured such that these projection ray paths pass through expansion portion 339 of upper waveguide 331 to form the intended images on the surfaces of keys 342 on the right side of keyboard 340. The timing for the projection of the images out projector 312, connected with lower waveguide 330, may be delayed a small amount (roughly on the order of tenths of nanoseconds, in one illustrative embodiment) relative to the projection of the images out projector 313 connected with upper waveguide 331, to compensate for the additional distance traveled before intersecting the surfaces of keys 342, analogously to a delay curve of the projection of the individual image portions from each of projectors 330, 331, or other projectors in other embodiments, as a function of the distance each image portion must travel before intersecting the key surfaces (roughly on the order of nanoseconds, in one illustrative embodiment). In other embodiments, these delays may not be implemented, without any significant impact on the desired precision of performance.

Figure 4:
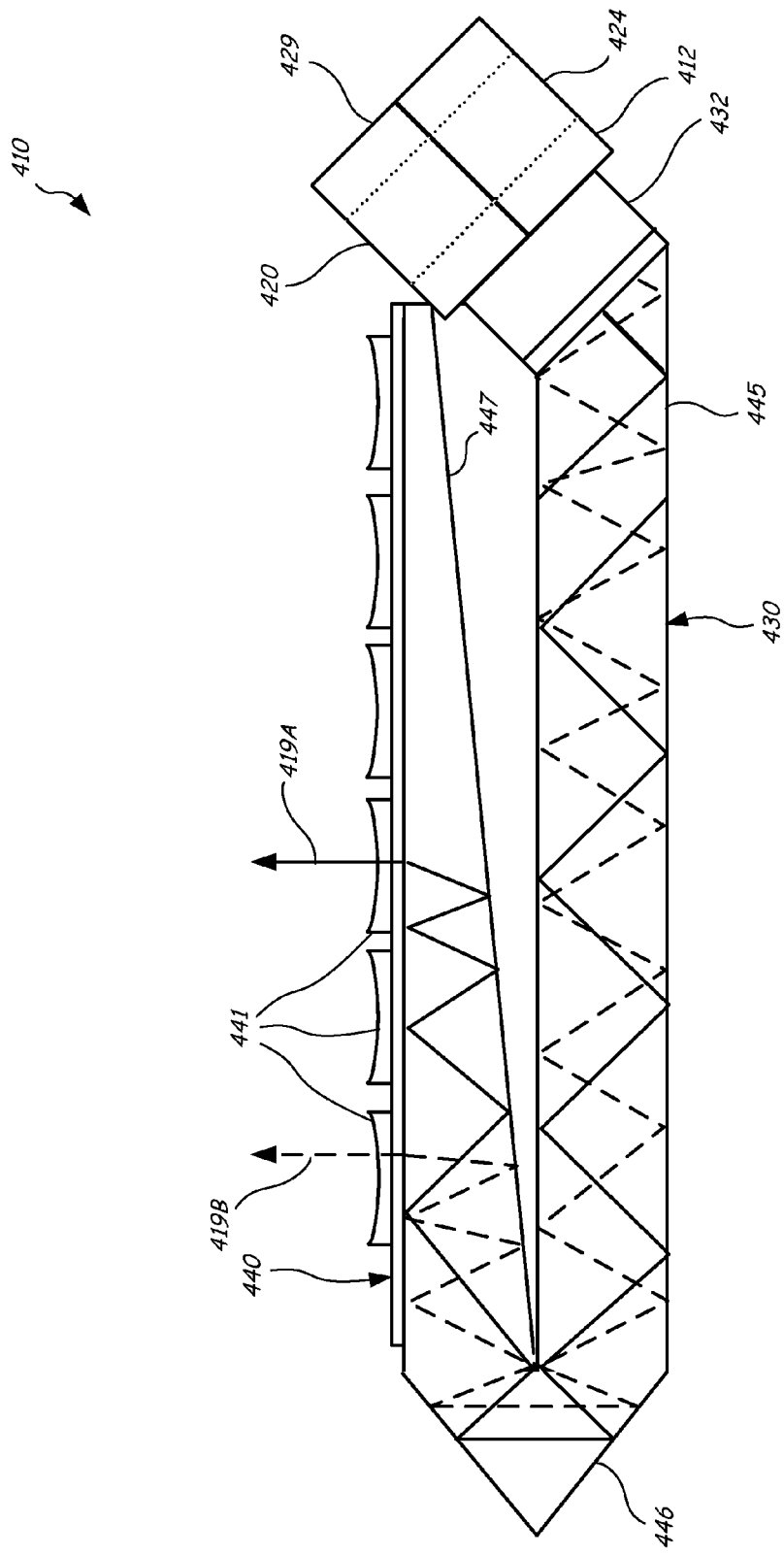
FIG. 4 illustrates a dynamic projected user interface device, according to another illustrative embodiment.

FIG. 4 depicts yet another illustrative embodiment of a dynamic projected user interface device 410, which uses a waveguide 430 that is folded over onto itself, thereby providing another way to prevent the form factor of the keyboard 440 from having bulky portions outside of the area of keys 441, by putting the expansion portion 445 underneath the keyboard 440. This folded-over approach could be used with a single projector covering the whole keyboard in one embodiment, or with two or more multiple projectors with corresponding expansion and image portions covering different sections of a keyboard, in other embodiments. In dynamic projected user interface device 410, projector 412, projection controller 420, imaging sensor 424, and communication interface 428 are operatively connected to waveguide nexus 432 and thereby to expansion portion 445 of waveguide 430. Waveguide 430 also includes a transition portion 446 connected to expansion portion 445, and then image portion 447 connected to transition portion 446, along the projection path away from the projector. Keyboard 440 is laid on top of image portion 447. The projection ray paths (illustratively indicated by sample projection ray paths 419A and 419B) for an image projected by projector 412 are thereby enabled to intersect the surfaces of keys 441 (a representative sample of which are indicated with reference number 441).

Projector 12B of FIGS. 2A, 2B, projectors 312, 313 of FIGS. 3A, 3B, and projector 412 of FIG. 4 provide projection ray paths that form images on the keys by passing underneath them through the waveguides and striking the keys from below. In other embodiments, the images can be provided to the image surfaces from above. An example of this is provided in FIG. 5.

Figure 5:
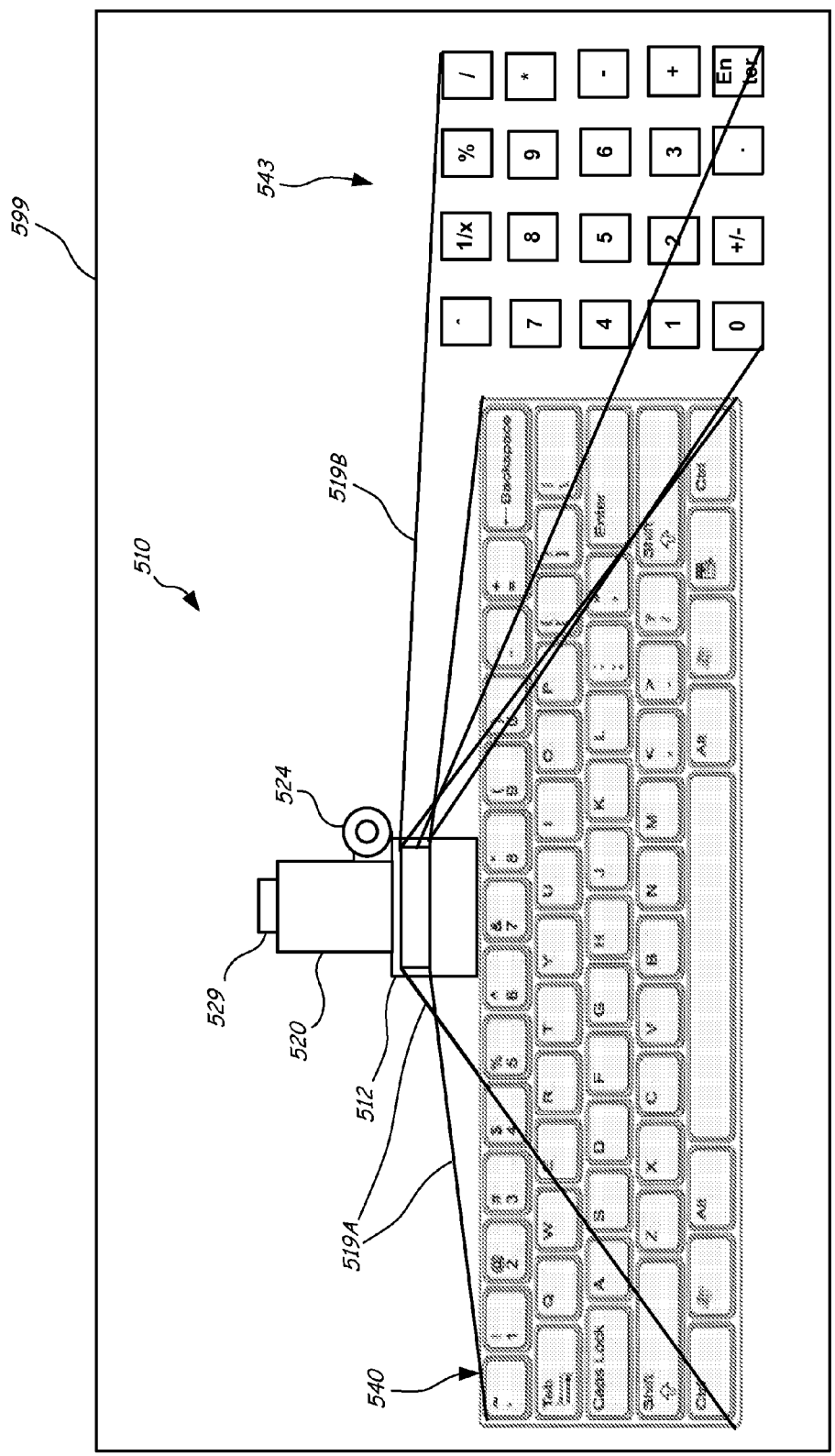
FIG. 5 illustrates a dynamic projected user interface device, according to another illustrative embodiment.

FIG. 5 depicts a dynamic projected user interface device 510 according to another illustrative embodiment that incorporates projection from above. Analogously to the depictions above, dynamic projected user interface device 510 includes a projector 512, a projection controller 520, an imaging sensor 524, and a communication interface 529, in an analogous functional arrangement as described above with reference to FIG. 1. Projector 512 is disposed above keyboard 540, which serves as a display surface, at a substantially low angle. Projector 512 may illustratively include a laser emitter, for example. Projector 512 is thereby configured to provide dynamically generated images onto keyboard 540, including orthographic characters and indicators of function keys, that are determined by the particular application or other operating context of an associated computing system that is communicatively connected with dynamic projected user interface device 510 through communication interface 529. Imaging sensor 524 includes a camera, in this embodiment, that is configured to capture and transmit optical images of the keyboard 540 and adjacent surfaces, and to detect any physical contacts with any of the keys of keyboard 540, and/or to detect when any of the keys of keyboard 540 are pressed.

Dynamic projected user interface device 510 is also configured to use additional, ambient surfaces off of keyboard 40 as additional display surfaces, as can be seen in the case of virtual numberpad 543. While projector 520 projects some rays 519A onto keyboard 540 to provide display images there, it also projects other rays 519B onto an ambient space from a portion of desktop 599 adjacent to keyboard 540, to provide additional input interface space. Virtual numberpad 543 is just one illustrative example of additional user interface images that can be projected onto any available ambient display surfaces, while imaging sensor 524 is equally capable of monitoring this additional user interface space such as virtual numberpad 543 and detecting physical contacts with the user interface images projected there that correspond to a user physically contacting or pressing on the surface at a location corresponding to a projected key, or whatever other form the ambient user interface space may take.

Among the advantages of such a projected, virtual user interface space is that it avoids taking up space on a user's workspace or adding bulk to a user's hardware, particularly for mobile devices, while adding additional user interface space on an as-needed basis. It may include any number of projected, virtual user interface spaces of any variety, for example, which may be projected on either or both sides of keyboard 540.

While a numberpad is depicted in FIG. 5, other virtual user interface spaces may include a media player, a game control console, another alphabetic keyboard, a musical keyboard, or a cursor control panel, for example, or any combination of these and other possible user interfaces. All of these projected user interfaces may be dynamically generated in accordance with an application currently being executed by an associated computing system, or any other type of computing context currently engaged on an associated computing system.

In order to provide display images to each of a large number of keys and other display surfaces, projector 520 may, for example, use a spatial light modulator, in one illustrative embodiment; or two-dimensional holographic projections, in another embodiment; or one or more laser emitters configured to project the display images in a rasterized scanning beam format, in another illustrative embodiment.

In one illustrative embodiment, projector 512 may be configured to emit a non-visible form of light, such as ultraviolet light, and at least some of the display surfaces comprise a composition adapted to re-emit visible light responsively to absorption of the non-visible light. This may be particularly useful to prevent the potential distraction of the light projected from projector 520 shining on the user's fingers when the user is striking keys on keyboard 540. For example, projector 540 may emit ultraviolet rays onto the keys of keyboard 540, while the keys include a composition that is adapted to re-emit light at visible frequencies responsively to absorption of the non-visible light. Such compositions may include phosphors, optical brighteners, quantum dots (composed for example with cadmium sulfide), or any of a wide variety of other substances that fulfill this function.

In order to prevent display images on keyboard 40 from being shadowed by a user's fingers, the keys of keyboard 40 may also include a composition that is further adapted to re-emit the visible light with a prolonged emission time, so that momentary occlusion of the light being projected onto one of the display surfaces will not prevent the display image from continuing to appear. The latency period for the prolonged emission may be selected so that display images will persist for longer than the typical time a user might have her fingers in a given position over part of the keyboard during normal usage, but not so long as to interfere substantially with a subsequent dynamically generated image, when the image configuration for that key is reassigned. This may be in part addressed by a means for selectively dispersing a persistently latent image, such as by digital light processing, for example.

Projector 512 may also include ultraviolet emitters for projecting onto keyboard 540, in addition to visible light emitters for projecting onto an ambient display surface, which may not be ideally configured for reflecting easily visible light in response to emission of ultraviolet or other non-visible light. In another embodiment, a user may be enabled to test and select from a variety of types of emitted light for the display images, so that the user is free to select ultraviolet projections for ambient surfaces that interact well with ultraviolet projections, or to select a visible frequency of her preference.

Some components of dynamic projected user interface device 510 may be located separately from keyboard 540, such as imaging sensor 524, for example. Keyboard 540 may also include one or more positioning reference transmitters, for example on the corners thereof and in a non-visible optical frequency such as infrared, that may be tracked by imaging sensor 524 and used to reference the position and orientation of keyboard 540. Imaging sensor 524 may use this positioning reference to continue directing its imaging at the relevant positions of the keys 541 on keyboard 540 as keyboard 540 moves relative to imaging sensor 524.

Figure 6:
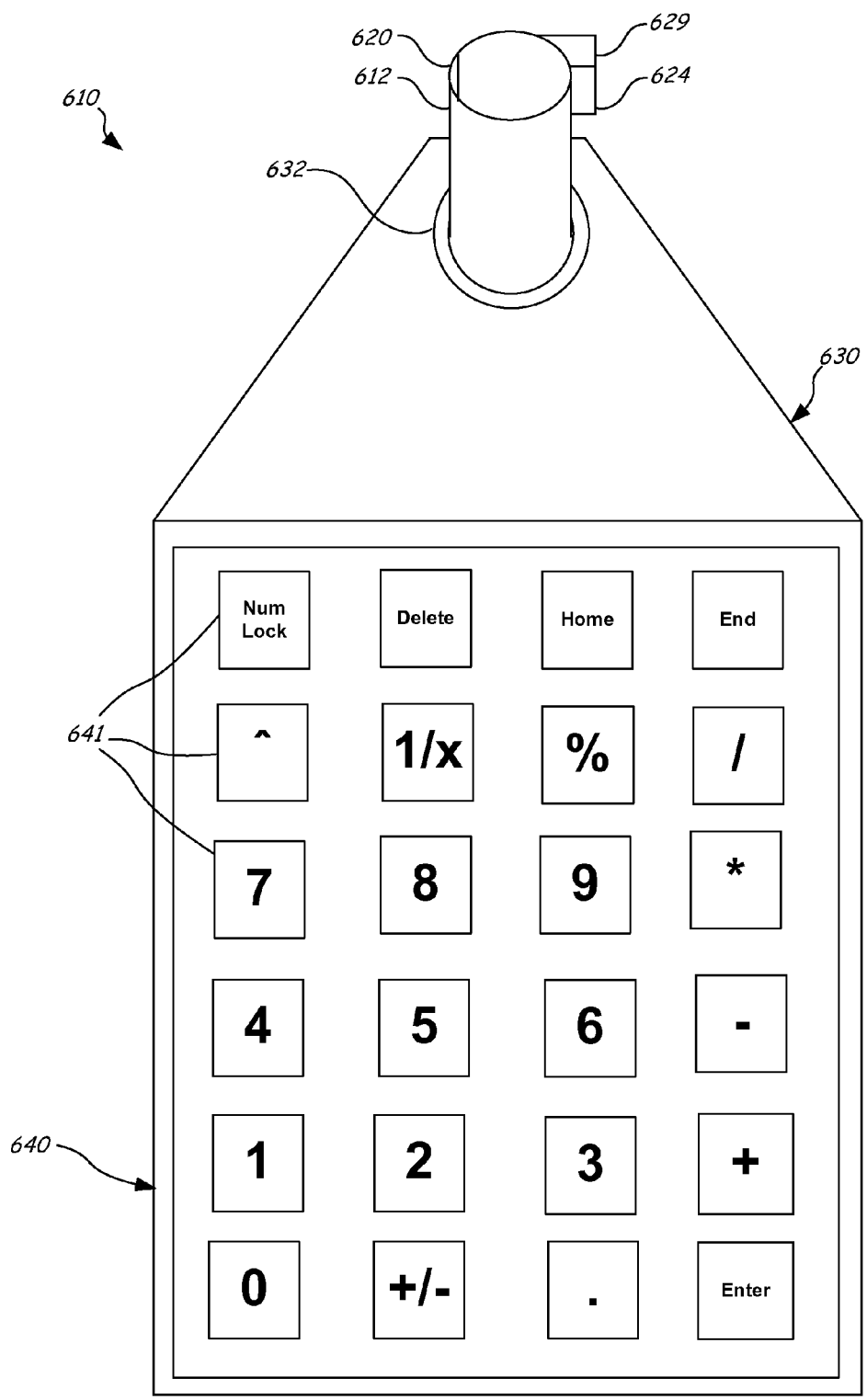
FIG. 6 illustrates a dynamic projected user interface device, according to another illustrative embodiment.
Figure 7:
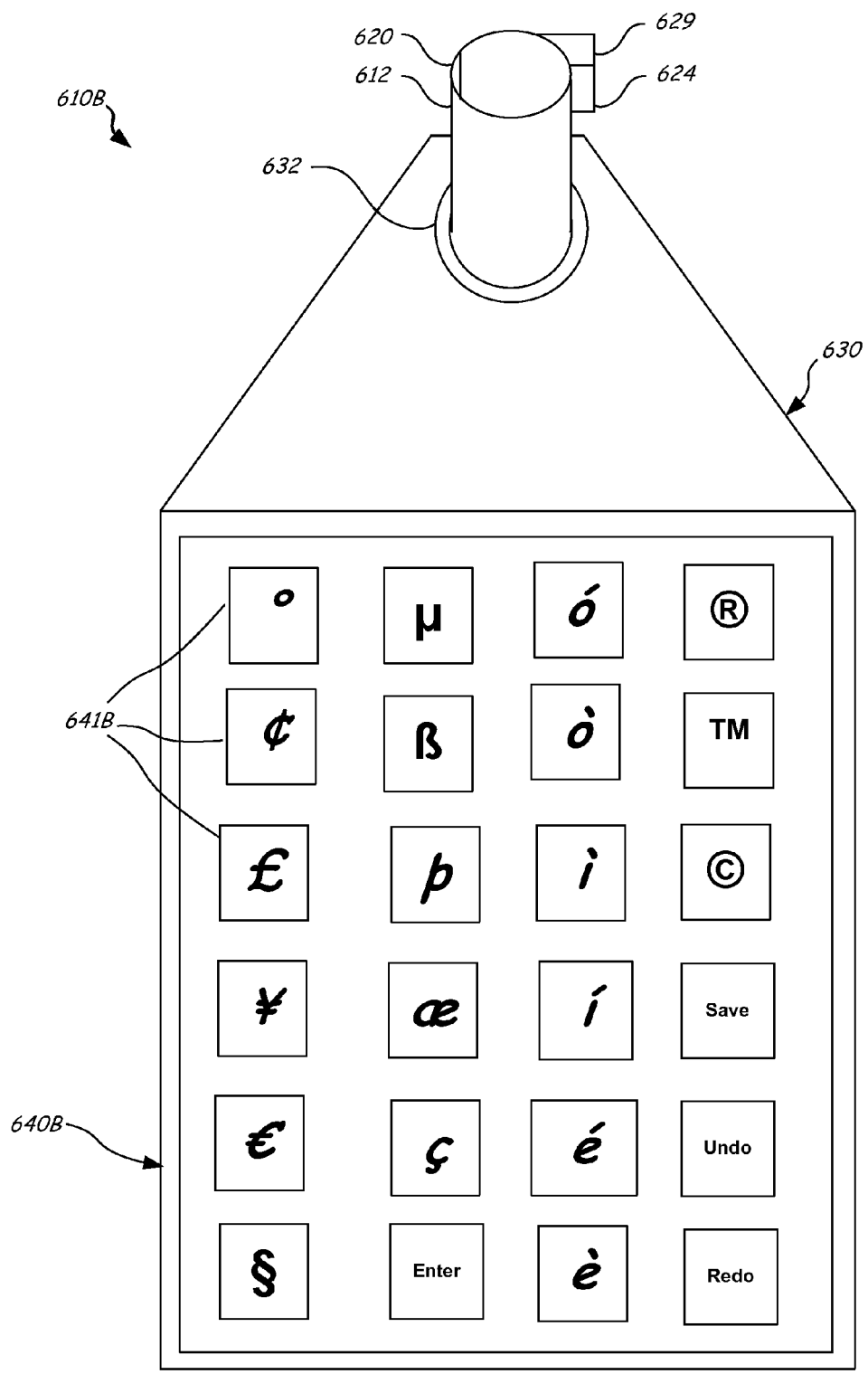
FIG. 7 illustrates a dynamic projected user interface device, according to another illustrative embodiment.

FIGS. 6 and 7 provide additional illustrative demonstration of a dynamic generated user interface. FIG. 6 depicts a dynamic projected user interface device 610 according to another illustrative embodiment, that constitutes a standalone numeric keypad. Analogously to the depictions above (and depicted here as a simplified block diagram), dynamic projected user interface device 610 includes a projector 612; a projection controller 620; an imaging sensor 624; a waveguide 630, configured to convey the display images from projector 612 onto the bottom surfaces of keys 641 of keyboard 640, and to convey optical images of user contact with keys 610 back to imaging sensor 624; and a communication interface 629, configured to provide a communicative connection with an associated computing system that provides instructions to and receives input from dynamic projected user interface device 610, in an analogous functional arrangement as described with reference to the other embodiments, above.

In the state in which it is depicted in FIG. 6, dynamic projected user interface device 610 includes display images for a fairly conventional layout for a numeric keypad, such as might be the initial default in which it starts out beginning when the operating context of the associated computing system includes the operating system and background processes and system tray functions running, but no active applications being executed. This layout may persist as the default when some other applications are opened by a user. Other applications may be configured so that when they are opened, they quickly reconfigure the layout of the of keypad dynamic projected user interface device 610 as a matter of course, to provide input interface functionalities special to that application. Some applications, or the operating system itself, or other operating context of the associated computing system, may also enable user-configurability for dynamic projected user interface device 610.

FIG. 7 depicts dynamic projected user interface device 610B, as a version of dynamic projected user interface device 610 that has been enabled for user configurability, in an illustrative layout reflecting potential reconfigurations and reassignments of the display images and corresponding functionalities that have been selected by a user. The user in this case has reassigned various keys 641B on the keypad 640B with the symbol for degrees; currency symbols for cents, British pounds, Japanese yen, and euros; a section symbol; the Greek letters "mu" and "beta"; the Old English letters "thorn" and "aesc"; a letter "c" with a cédille, i.e. "ç", as used for example in French for a letter "c" pronounced with an "s" sound; an "enter" key, now in a different location; symbols for registered trademark, trademark, and copyright; a few keys left blank; a sampling of vowels with diacritics that may represent accent marks or Chinese tones; and keys assigned for certain functions, in particular, "save", "undo", and "redo".

The user has thereby reconfigured the keypad 640B of the dynamic projected user interface device 610B for her convenience, including by reconfiguring keys for orthographic characters as function keys and vice versa; and the reassignment inputs entered by the user were interpreted by the particular application at hand to provide instructions through communication interface 629 to dynamic projected user interface device 610, which thereby dynamically generated the new key display images accordingly. At the same time, the application reorders the interpretation of the inputs sensed by imaging sensor 624 to correspond to inputs in accordance with the display images in current display on the keys 641B.

The user, or another application or computing context, may later reconfigure the state of keypad 640B yet again by dynamically generating additional new display images and reconfiguring the interpretation of inputs on those keys accordingly. The examples in FIG. 7 are only a small sampling of possible reconfigured keys of a dynamic projected user interface device. Other operating contexts may include, for example, a math or physics modeling application, which provides options for assigning mathematical functions to the keys on keypad 640; a presentation application that provides options for clipart icons to be assigned to the keys on keypad 640; or a word processing program, which alters the fonts of the letters and other orthographic characters as they are displayed on a keyboard in accordance with a font selected within the word processing application; while many other possible examples are readily apparent from the configurations that naturally suggest themselves for any type of application or computing context.

The applications and their operating environments that may be used in such a way are further described with reference to FIGS. 8 and 9. Software that includes computer-executable instructions for implementing such a system may be stored on a medium such as a hard drive, an optical disc, a flash drive, etc., and may be available to a computing system on a local bus, a network connection, and so forth. The software may configure a computing system to project user interface display images onto display surfaces. The user interface display images may be selectable from several user interface display images dependent on a context of the computing system, such as an application, an operating system, a network connection status, etc. The computing system may then detect physical contacts with the one or more display surfaces while the one or more user interface display images are projected thereon, and interpret the physical contacts with the user interface display images as user inputs associated with the context of the computing system.

Figure 8:
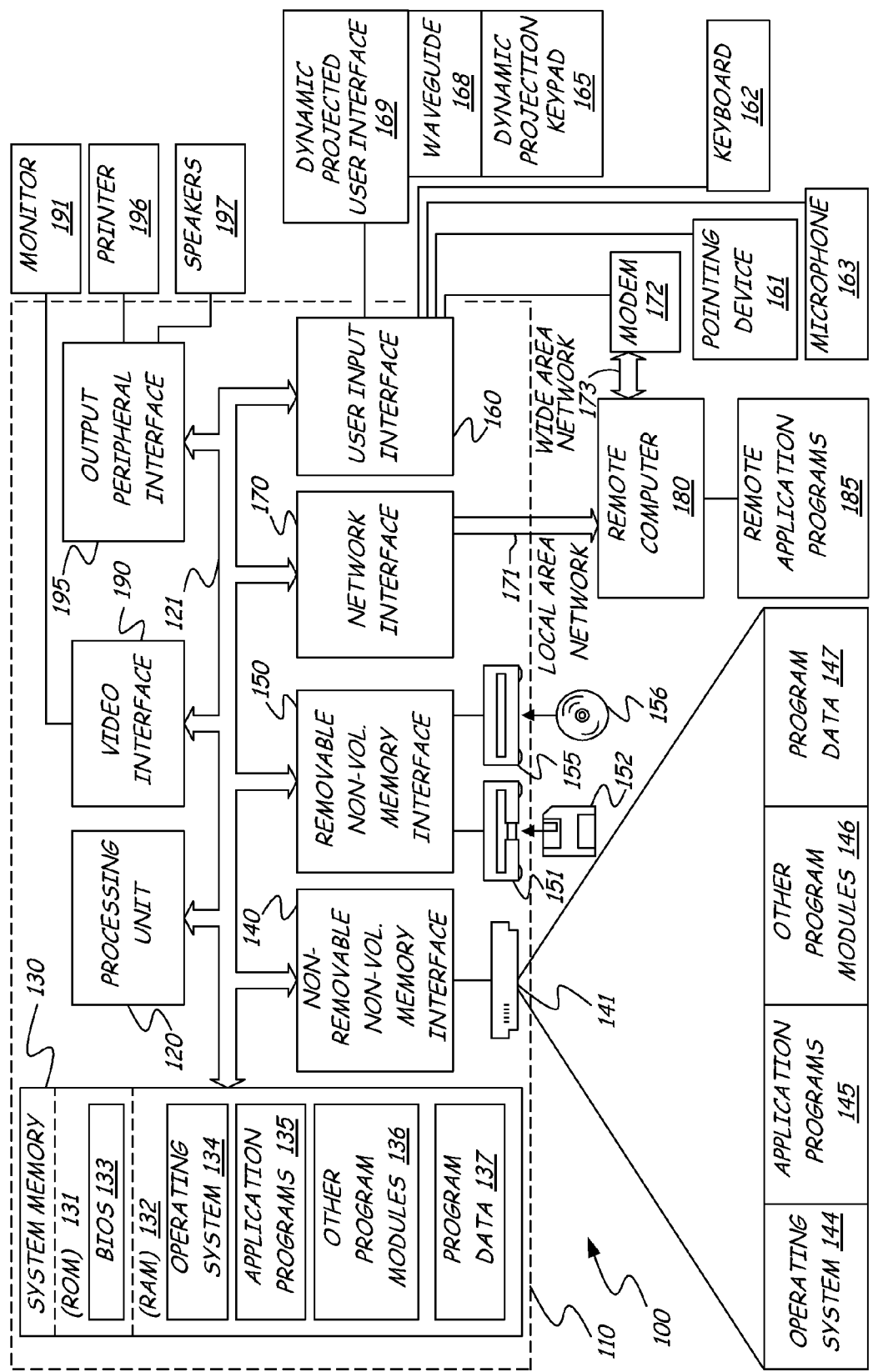
FIG. 8 is a block diagram of one computing environment in which some embodiments may be practiced, according to another illustrative embodiment.

FIG. 8 illustrates an example of a suitable computing system environment 100 on which various embodiments may be implemented. For example, various embodiments may be implemented as software applications, modules, or other forms of instructions that are executable by computing system environment 100 and that configure computing system environment 100 to perform various tasks or methods involved in different embodiments. A software application or module associated with an illustrative implementation of a dynamic projected user interface may be developed in any of a variety of programming or scripting languages or environments. For example, it may be written in C#, F#, C++, C, Pascal, Visual Basic, Java, JavaScript, Delphi, Eiffel, Nemerle, Perl, PHP, Python, Ruby, Visual FoxPro, Lua, or any other programming language. It is also envisioned that new programming languages and other forms of creating executable instructions will continue to be developed, in which further embodiments may readily be developed.

According to one illustrative embodiment, computing system environment 100 may be configured to perform collocation error proofing tasks in response to receiving an indication of a word collocation in a text. Computing system environment 100 may then perform a Web search for each of one or more query templates associated with the indicated word collocation. Various query templates used may include a sentence, a reduced sentence, a chunk pair, and/or an individual word pair, any of which may include the word collocation. Computing system environment 100 may then evaluate whether results of the Web search for each of the query templates indicates that the word collocation corresponds to normal usage, or whether it is disfavored or indicative of likely error. Normal usage may be indicated by either an exact match of the query template comprising the sentence, or a matching score that is larger than a preselected threshold. The system may then indicate, as part of the output of computing system environment 100 via a user-perceptible output device as a result of an embodiment of a collocation error proofing method, whether the word collocation corresponds to normal usage, or is disfavored and is indicated to be erroneous usage.

Computing system environment 100 as depicted in FIG. 8 is only one example of a suitable computing environment for executing and providing output from various embodiments, and is not intended to suggest any limitation as to the scope of use or functionality of the claimed subject matter. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices. As described herein, such executable instructions may be stored on a medium such that they are capable of being read and executed by one or more components of a computing system, thereby configuring the computing system with new capabilities.

With reference to FIG. 8, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 8 illustrates operating system 134, application programs 135, other program modules 136, and program data 137.

The computer 110 may also include other removable/non-removable volatile/nonvolatile computer storage media. By way of example only, FIG. 8 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 8, provide storage of computer readable instructions, data structures, program modules and other data for the computer 110. In FIG. 8, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 8 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 8 illustrates remote application programs 185 as residing on remote computer 180. It will be appreciated that the network connections shown are exemplary and other means of establishing a communications link between the computers may be used.

Figure 9:
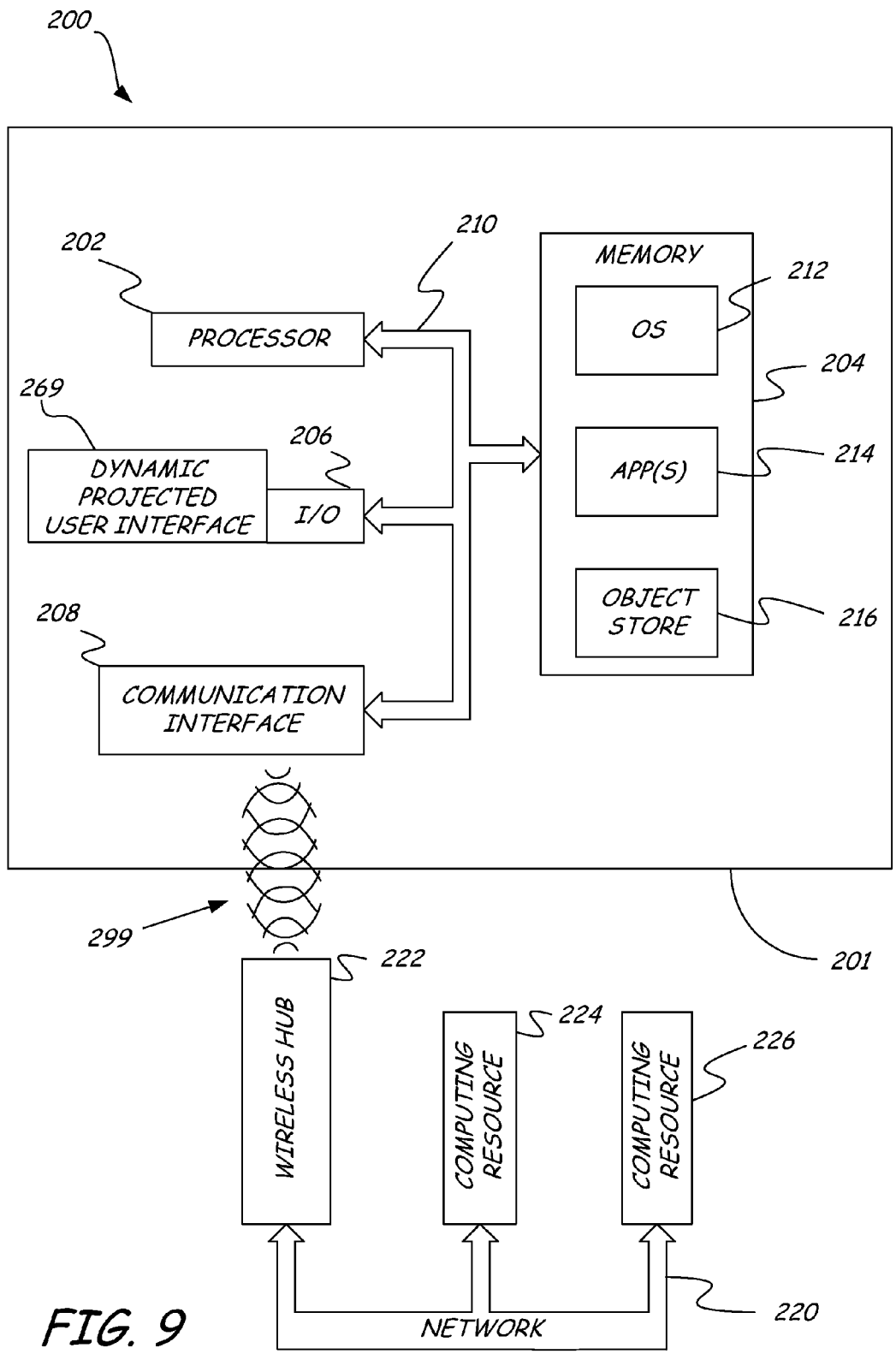
FIG. 9 is a block diagram of a computing environment in which some embodiments may be practiced, according to another illustrative embodiment.

FIG. 9 depicts a block diagram of a general mobile computing environment, comprising a mobile computing device and a medium, readable by the mobile computing device and comprising executable instructions that are executable by the mobile computing device, according to another illustrative embodiment. FIG. 9 depicts a block diagram of a mobile computing system 200 including mobile device 201, according to an illustrative embodiment. Mobile device 201 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is illustratively allocated as addressable memory for program execution, while another portion of memory 204 is illustratively used for storage, such as to simulate storage on a disk drive.

Memory 204 includes an operating system 212, application programs 214 as well as an object store 216. During operation, operating system 212 is illustratively executed by processor 202 from memory 204. Operating system 212, in one illustrative embodiment, is a WINDOWS® CE brand operating system commercially available from Microsoft Corporation. Operating system 212 is illustratively designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200, such as dynamic projected user interface 269.

Mobile computing system 200 also includes network 220. Mobile computing device 201 is illustratively in wireless communication with network 220—which may be the Internet, a wide area network, or a local area network, for example—by sending and receiving electromagnetic signals 299 of a suitable protocol between communication interface 208 and wireless interface 222. Wireless interface 222 may be a wireless hub or cellular antenna, for example, or any other signal interface. Wireless interface 222 in turn provides access via network 220 to a wide array of additional computing resources, illustratively represented by computing resources 224 and 226. Naturally, any number of computing devices in any locations may be in communicative connection with network 220. Computing device 201 is enabled to make use of executable instructions stored on the media of memory component 204, such as executable instructions that enable computing device 201 to implement various functions of dynamic projected user interface 269, in an illustrative embodiment.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. As a particular example, while the terms "computer", "computing device", or "computing system" may herein sometimes be used alone for convenience, it is well understood that each of these could refer to any computing device, computing system, computing environment, mobile device, or other information processing component or context, and is not limited to any individual interpretation. As another example, while some embodiments are depicted and described with one or two projectors and associated components, any number of projectors can be used in other embodiments, with their associated components, and configured to provide display images each to their own portion of one or more display surfaces, or to overlapping portions of one or more display surfaces. This may include top-down or bottom-up projections, or a combination of the two, and may include waveguides disposed between any or all of the individual projectors and their respective display surfaces, and with any combination of purpose-built display surfaces such as a keyboard or keypad, or ambient display surfaces. As yet another particular example, while many embodiments are presented with illustrative elements that are widely familiar at the time of filing the patent application, it is envisioned that many new innovations in computing technology will affect elements of different embodiments, in such aspects as user interfaces, user input methods, computing environments, and computing methods, and that the elements defined by the claims may be embodied according to these and other innovative advances while still remaining consistent with and encompassed by the elements defined by the claims herein.

What is claimed is:

1. A device comprising:
   a projector;
   a keypad comprising one or more keys;
   a waveguide comprising an image portion having a first surface forming a first boundary of the image portion and a second surface spaced apart from the first surface and forming a second boundary of the image portion, wherein the first and second surfaces of the image portion converge along a projection path from the projector and are configured to reflect rays of electromagnetic radiation by internal reflection through a first portion of the image portion to a second portion of the image portion, and wherein the one or more keys have a first key surface facing the second portion of the image portion and a second key surface opposite the first key surface;
   a projection controller, configured to receive instructions from a computing device and to provide one or more display images via the projector onto one or more display surfaces, the one or more display surfaces comprising the second key surface of one or more of the keys, the waveguide being disposed between the projector and the one or more display surfaces and the waveguide comprising an expansion portion with boundaries that diverge along the projection path away from the projector, the projector being positioned in interface with the expansion portion and the image portion being positioned in interface with the one or more display surfaces, such that rays emitted by the projector are internally reflected throughout the expansion portion and are transmitted from the image portion to the one or more display surfaces, the waveguide including a waveguide nexus configured to reflect images from the projector onto respective image paths in the expansion portion, the projector being positioned adjacent the waveguide nexus and configured to project the images directly to the waveguide nexus, and wherein the display images are indicative of a first set of input controls when the computing device is in a first operating context, and a second set of input controls when the computing device is in a second operating context; and
   an imaging sensor, configured to optically detect physical contacts between an object and the one or more display surfaces.

2. The device of claim 1, wherein the keypad comprises at least one of a keyboard, a numeric keypad, a game controller, and a musical keyboard.

3. The device of claim 1, wherein the imaging sensor is disposed in connection with the waveguide and configured to detect physical contacts with the one or more display surfaces by imaging the physical contacts through the waveguide.

4. The device of claim 1, further comprising one or more additional projectors and waveguides, such that each of the waveguides is disposed between one of the projectors and a portion of the one or more display surfaces.

5. The device of claim 1, wherein the projector is configured to emit non-visible light, and the one or more display surfaces comprise a composition adapted to re-emit visible light responsively to absorption of the non-visible light.

6. The device of claim 1, wherein the projector is configured to emit non-visible light, and wherein the imaging sensor is configured to obtain images from reflections of the non-visible light through the one or more display surfaces.

7. The device of claim 1, wherein the projector comprises a spatial light modulator, and one or more laser emitters configured to project the display images in a rasterized scanning beam format.

8. The device of claim 1, further configured to detect a plurality of different modes of physical contact with the one or more display surfaces, such that a plurality of different inputs are enabled for a single one of the display surfaces, as a function of characteristics of the physical contact with that display surface.

9. A device comprising:
   a keypad, comprising one or more displaceable keys;
   an imaging sensor configured for entering input to a computing system;
   a substantially flat, tapered waveguide disposed between the keypad and the imaging sensor, the waveguide configured to enable the imaging sensor to detect physical displacement of the one or more keys by imaging at least a portion of the one or more keys, the keys including at least a partially transparent portion such that the imaging sensor is further configured to detect physical contact with the keys and to convey to the computing system a plurality of characteristics of the physical contact with the keys, thereby enabling a plurality of different inputs for each of the keys as a function of the characteristics of the physical contact; and
   a projector operatively connected to an output interface of the computing system, the projector being configured for dynamically generating images as a function of output from the computing system, and projecting the dynamically generated images through the waveguide and onto the one or more keys.

10. The device of claim 1, wherein the one or more keys comprise a plurality of keys disposed on at least a portion of the keypad, the portion of the keypad being disposed adjacent the first surface of the image portion, wherein the plurality of keys are arranged on the portion of the keypad in a direction of the projection path and the first and second surfaces of the image portion are configured to direct rays of electromagnetic radiation, emitted from the projector, along at least a portion of the projection path and onto each of the plurality of keys.

11. The device of claim 1, wherein the one or more keys comprise a plurality of keys arranged on the keypad in a plurality of rows, wherein the image portion is configured to direct rays of electromagnetic radiation, emitted from the projector, along the projection path and onto a number of keys in each of the plurality of rows.

12. A device comprising:
a projector;
a keypad comprising one or more keys having a first key surface facing a waveguide and a second key surface opposite the first surface;
a projection controller configured to receive instructions from a computing device and to provide one or more display images via the projector onto one or more display surfaces, the one or more display surfaces comprising the second key surface of one or more of the keys, wherein the display images are indicative of a first set of input controls when the computing device is in a first operating context, and a second set of input controls when the computing device is in a second operating context; and
an imaging sensor configured to optically detect physical contacts between an object and the one or more display surfaces, and further configured to detect a plurality of different modes of physical contact with the one or more display surfaces, such that a plurality of different inputs are enabled for a single one of the display surfaces, as a function of characteristics of the physical contact with that display surface.

13. The device of claim 12, wherein the plurality of different modes of physical contact comprise at least one mode in which at least one of the plurality of keys is stroked in a lateral direction across the second surface of the at least one key, and at least one mode in which the at least one key is physically displaced in a direction toward the waveguide.

14. The device of claim 12, wherein the keypad comprises a plurality of keys disposed on at least a portion of the keypad, and wherein the waveguide comprises:
an image portion having a first surface forming a first boundary of the image portion and a second surface spaced apart from the first surface and forming a second boundary of the image portion, the first and second boundaries converging along a projection path away from the projector, wherein the plurality of the keys have a first key surface facing the image portion and a second key surface opposite the first surface, and wherein the image portion is configured to direct rays of electromagnetic radiation, emitted from the projector, along the projection path and onto each of the plurality of the keys.

15. The device of claim 1, wherein the first portion of the image portion is configured to reflect rays of electromagnetic radiation with total internal reflection and the second portion of the image portion is configured to direct rays of electromagnetic radiation to the first surface of the image portion at an angle past a critical angle.

16. The device of claim 9, wherein each of the one or more keys of the keypad have a first surface facing the waveguide and a second surface opposite the first surface, and wherein the waveguide is configured to enable the imaging sensor to detect physical contact with the second surface of the one or more keys and to detect physical displacement of the one or more keys, thereby enabling a plurality of different inputs for each of the one or more keys.

* * * * *